Oct. 13, 1931. W. STEININGER 1,827,339
LAWN SPRINKLER
Filed July 27, 1929
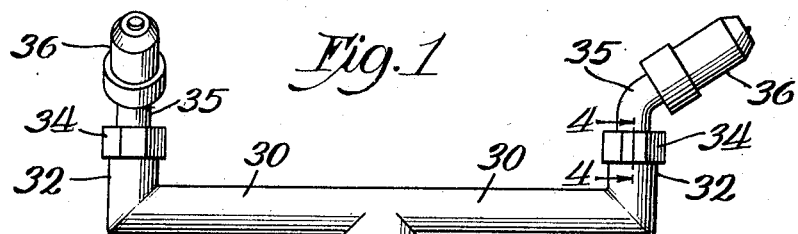
Fig.1
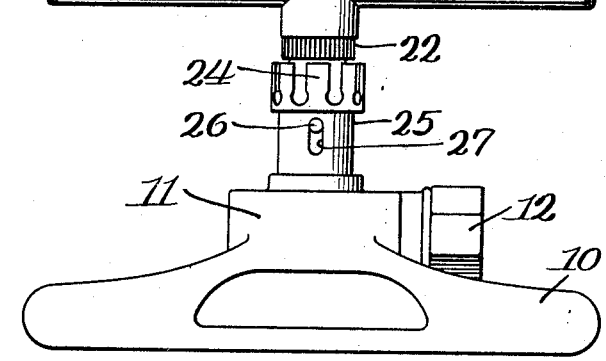
Fig.2
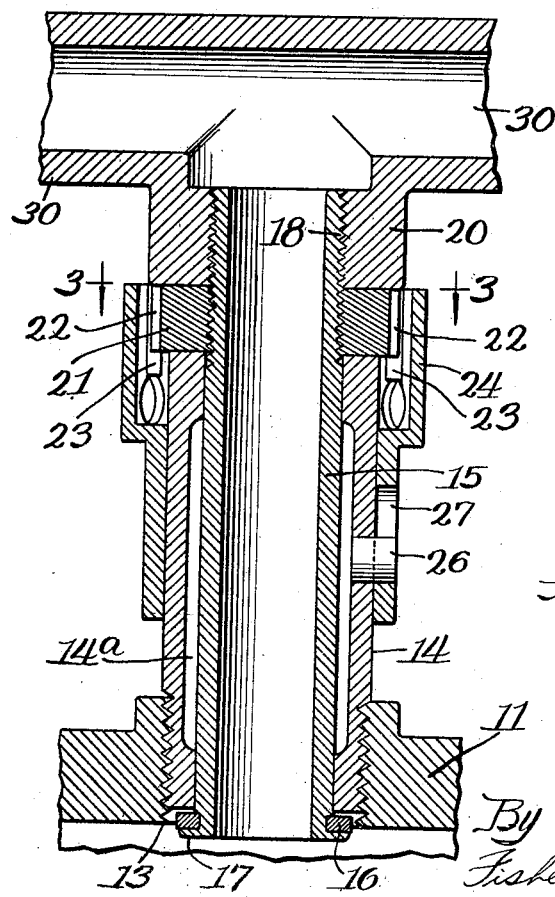
Fig.3
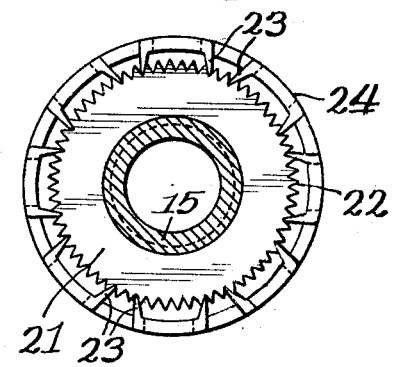
Fig.4
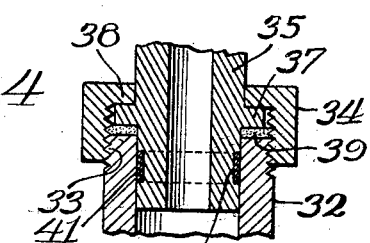
Inventor
By William Steininger
Fisher, Clapp, Soans & Pond Attys Patented Oct. 13, 1931

1,827,339

UNITED STATES PATENT OFFICE

WILLIAM STEININGER, OF BERWYN, ILLINOIS, ASSIGNOR TO W. D. ALLEN MANUFACTURING COMPANY, OF CHICAGO, ILLINOIS, A CORPORATION

LAWN SPRINKLER

Application filed July 27, 1929. Serial No. 381,455.

The present invention relates more particularly to that type of lawn sprinklers in which there is provided a rotatable head suitably mounted upon a supporting base. An example of this type of sprinkler is shown in an application filed by me in the United States Patent Office January 12, 1929, Sr. No. 332,178.

An object of my invention is to provide a new and improved lawn sprinkler which will be simple in construction, inexpensive to manufacture, efficient in operation, and rugged.

A further object is to provide such a device which will have a rotatable nozzle with means for optionally locking the nozzle against rotation, which locking means will be simple and efficient.

Various other objects and advantages will become apparent as the description proceeds.

The invention consists in the features of novelty hereinafter described, illustrated in the accompanying drawing and particularly pointed out in the claims at the end of this specification.

Figure 1 is a view in side elevation of a lawn sprinkler embodying my invention;

Figure 2 is a view in vertical section upon an enlarged scale through the central portion of the sprinkler, parts being omitted;

Figure 3 is a view in cross section on line 3—3 of Fig. 2;

Figure 4 is a view in vertical section on line 4—4 of Fig. 1.

As shown the sprinkler is provided with a suitable base 10, the lower part of which may be in the form of runners, united to a chambered portion 11, to which water will be admitted at a coupling 12 having connection with a hose. The top wall of the chambered portion 11 of the base is provided with a screw-threaded opening 13 adapted to receive a correspondingly threaded lower end of a tubular post 14. Within the tubular post 14 is revolubly mounted a hollow stem 15, the interior of the post 14 being preferably chambered, as at 14ª, to reduce the friction between said post and the hollow stem 15. The stem 15 is formed from a straight section of pipe of substantially uniform diameter and adjacent the lower end of the stem 15 there is provided a bearing ring 16 that is seated within a peripheral groove in the stem 15 and is held in place by the flange 17 formed at the end of the stem. The upper portion of the stem 15 is screw-threaded, as shown at 18, and the screw-threaded upper end of the stem 15 engages with a correspondingly threaded opening formed in the central or hub portion 20 of the hollow sprinkler head.

Between the hub 20 of the sprinkler head and the top of the tubular post 14 is placed an adjustable collar or nut 21 that is interiorly threaded to engage the threaded upper portion of the hollow stem 15. As shown, the periphery of the collar or nut 21 is formed with teeth or serrations 22 adapted to be engaged by the inwardly extending portions 23 of the fingers 24 that project upwardly from a band or sleeve 25 that encircles the tubular post 14. The band or sleeve 25 is movable axially of the post but is prevented from turning thereon by means of a pin 26 fixed to and projecting from the post and entering a vertical slot 27 in the band 25. The fingers 24 may be of any suitable number and are preferably formed integral with and offset from the body of the band 25, as shown.

In the preferred embodiment of my invention shown in the drawings, the collar or nut 21 performs several functions, i. e., it serves as a nut lock to effect a secure engagement of the sprinkler head with the upper end of the stem 15; it serves also as the upper bearing for the sprinkler head upon the top of the tubular post 14, and the toothed periphery of the collar 21 cooperates with the locking sleeve in holding the sprinkler head against rotation when desired.

In order to assemble the parts as shown, the tubular post 14 (before being connected to the base and with the locking ring 25 in position on the post) will have the hollow stem 15 passed upward through the post until the bearing ring 16 contacts with, or approximately contacts with the lower end of the post 14. The collar 21 will then be screwed down upon the threaded portion 18 of the stem 15 until the lower face of the sleeve bears lightly against the upper end of the post 14. The threaded portion 18 of the stem 15 extending above the collar 21 will next be screwed into the hub 20 of the sprinkler head and the collar 21 will be turned to tightly jam it against the lower end of the hub 20 and thus securely lock the sprinkler head upon the upper end of the stem 15. Not only does the collar 21 afford a secure locking engagement of the sprinkler head with the stem 15, but by means of the collar, the accurate vertical positioning of the stem 15 within the post 14 can be effected. When the parts have thus been assembled, the lower threaded end of the post 14 will be screwed into the chambered upper portion 11 of the base 10.

When it is desired to lock the sprinkler head against rotation due to the impact of water passing through the sprinkler the band or sleeve 25 will be moved from the position shown in Fig. 1 of the drawing axially in an upward direction until the inturned portions 23 of the fingers 24 engage with the toothed periphery of the collar 21, as shown in Figs. 2 and 3, and the slight resilience of the fingers 24 will retain the fingers in engagement with the collar. When, however, the locking band 25 is in the position shown in Fig. 1, the sprinkler head and collar 21 will be free to revolve upon the top of the post 14.

From the depending hub or central portion 20 of the sprinkler head extend laterally the usual hollow arms 30, each having at its end an upturned portion 32 that is peripherally threaded, as at 33, to receive the inwardly threaded retaining nut 34 that serves to hold in place the stem 35 of the corresponding spray nozzle 36. The stem 35 of each of the spray nozzles 36 is formed with a periphtral rib or flange 37, above which extends the inner flange 38 of the corresponding retaining nut 34.

Between the rib or flange 37 and the end of the upturned portion 32 of the sprinkler arm 30 is placed a suitable packing 39, to guard against leakage. To further aid in preventing leakage of water about the stems 35 of the spray nozzles 36, each of these stems 35 is formed with a peripheral groove 40 to receive suitable packing 41 that will bear against the interior wall of the upturned portion 32 of the arm 30. The stems of the spray nozzles 36 may be turned or adjusted within the upturned ends 32 of the arms 30 in order to modify the speed of revolution of the sprinkler head. By providing the stems 35 of the spray nozzle 36 with the peripheral recesses 40 and packing 41, all danger of leakage of water around the stems of the spray nozzles is avoided.

My invention provides an extremely simple and effective form of lawn sprinkler, the parts of which are easily and cheaply manufactured and can be readily assembled.

While I have described what I regard as the preferred embodiment of my invention, it will be understood that the details of construction above set forth may be varied without departure from the scope of the invention and that features of the invention may be employed without its adoption as an entirety.

I claim:

1. A sprinkler of the class described embodying the combination with a base, of a tubular post extending from said base, a hollow stem rotatably mounted in said post and having a corrugated annular portion, and means for locking said sprinkler head comprising a band encircling said post and movable axially thereof, said band being provided with a finger engageable with said corrugated portion to lock the sprinkler head against rotation.

2. A sprinkler of the class described embodying the combination with a base, of a tubular post extending from said base, a hollow stem rotatably mounted in said post and having a corrugated annular portion, and means for locking said sprinkler head comprising a band encircling said post and movable axially thereof but fixed against rotation, said band being provided at its upper end with a plurality of fingers engageable with said corrugated portion to lock the sprinkler head against rotation.

3. A sprinkler of the class described embodying the combination with a base, of a tubular post extending upwardly from said base, a hollow stem rotatably mounted in said post and having a bearing at its lower end, a sprinkler head connected to the upper end of said stem, an adjustable collar mounted upon said stem between the sprinkler head and the top of said post, said collar having a toothed periphery, a band beneath said collar encircling said post and movable axially thereof, said band being provided with a finger engageable with said collar to lock the collar and sprinkler head against rotation.

4. A device as defined in claim 3 wherein said adjustable collar serves as a bearing for said stem.

5. In a device of the class described, a base, a tubular post extending from said base, a hollow stem rotatably mounted in said post and carrying adjacent its upper end a sprinkler head, an adjustable annular member on said stem and bearing against the upper portion of said post, said annular member having corrugations on its outer periphery, and an annular member longitudinally slidable on said post and engageable with said corrugations for locking said stem against rotation.

WILLIAM STEININGER.